(12) United States Patent
Hu et al.

(10) Patent No.: US 10,187,631 B2
(45) Date of Patent: Jan. 22, 2019

(54) AUTOSTEREOSCOPIC PIXEL EMITTING UNIT AND AUTOSTEREOSCOPIC DISPLAY DEVICE

(71) Applicant: ALADM 3D DISPLAY TECHNOLOGY CO., LTD., Changzhou (CN)

(72) Inventors: Chi-Chung Hu, Changzhou (CN); Chih-Ming Lai, Changzhou (CN)

(73) Assignee: ALADM 3D DISPLAY TECHNOLOGY CO., LTD, Changzhou (CN)

( * ) Notice: Subject to any disclaimer, the term of this patent is extended or adjusted under 35 U.S.C. 154(b) by 117 days.

(21) Appl. No.: 15/319,647

(22) PCT Filed: Jun. 16, 2015

(86) PCT No.: PCT/CN2015/000417
§ 371 (c)(1),
(2) Date: Dec. 16, 2016

(87) PCT Pub. No.: WO2015/192646
PCT Pub. Date: Dec. 23, 2015

(65) Prior Publication Data
US 2017/0155891 A1 Jun. 1, 2017

(30) Foreign Application Priority Data

Jun. 17, 2014 (CN) .......................... 2014 1 0269115

(51) Int. Cl.
*H04N 7/18* (2006.01)
*H04N 13/305* (2018.01)
(Continued)

(52) U.S. Cl.
CPC ........... *H04N 13/305* (2018.05); *G02B 27/22* (2013.01); *G02B 27/2214* (2013.01); *G09F 9/33* (2013.01);
(Continued)

(58) Field of Classification Search
CPC ........... G02B 27/2214; H04N 13/0404; H04N 13/0409; H04N 13/0418; H04N 13/0422;
(Continued)

(56) References Cited

U.S. PATENT DOCUMENTS 5,111,313 A * 5/1992 Shires ...................... G02B 5/32
348/E13.056
5,493,427 A * 2/1996 Nomura ................. G02B 3/005
349/5

(Continued)

FOREIGN PATENT DOCUMENTS

| CN | 103 051 906 | 4/2013 |
| CN | 103 995 361 | 8/2014 |

(Continued)

OTHER PUBLICATIONS

International Search Report dated Sep. 11, 2015 issued in connection with corresponding International patent application No. PCT/CN2015/000417.

*Primary Examiner* — Shan E Elahi
(74) *Attorney, Agent, or Firm* — Amster, Rothstein & Ebenstein LLP (57) ABSTRACT

An autostereoscopic pixel emitting unit and multi-view autostereoscopic display device comprised of the pixel emitting units; an optical package covers the sub-pixel unit and each sub-pixel unit contains at least a red, green and blue light-emitting unit; each optical package contains at least an optical guide area and a mixing light area; the image display surface formed by matrix configuration can lead the multi- (Continued)

view stereoscopic images to left and right eyes of different viewers, and form stereoscopic vision through perception of human brains. The autostereoscopic display unit is minimized so that the display device has multiple advantages such as free from panel optical lens size restriction, large-area display, plane or curved surface installation, without frame joint, simultaneous display or functional conversion of 2D/3D images, easy maintenance, safety, and environmental protection.

22 Claims, 11 Drawing Sheets (51) Int. Cl.
 G02B 27/22 (2018.01)
 G09F 9/33 (2006.01)
 H04N 13/32 (2018.01)
 H04N 13/324 (2018.01)
 H04N 13/31 (2018.01)
 H04N 13/359 (2018.01)
(52) U.S. Cl.
 CPC ............ H04N 13/31 (2018.05); H04N 13/32 (2018.05); H04N 13/324 (2018.05); H04N 13/359 (2018.05); H04N 2213/001 (2013.01)
(58) Field of Classification Search
 CPC .. H04N 13/0454; H04N 13/305; H04N 13/31; H04N 13/32; H04N 13/324; H04N 13/359; H04N 2213/001
 USPC .......................................................... 348/59
 See application file for complete search history.

(56) References Cited

U.S. PATENT DOCUMENTS

| | | | | |
|---|---|---|---|---|
| 8,684,531 B2* | 4/2014 | Mashitani | ......... | G02B 27/2214 353/7 |
| 9,013,645 B2* | 4/2015 | Lee | ...... | G02F 1/0136 349/15 |
| 9,032,334 B2* | 5/2015 | Yu | ...... | G06F 3/017 715/849 |
| 9,164,286 B2* | 10/2015 | Odake | ......... | G02B 27/2214 |
| 9,319,655 B2* | 4/2016 | Lee | ...... | H04N 13/128 |
| 9,395,690 B2* | 7/2016 | Futterer | ...... | G02B 6/0046 |
| 9,459,785 B2* | 10/2016 | Kim | ...... | G06F 3/0488 |
| 9,507,160 B2* | 11/2016 | Cho | ...... | G02B 27/2214 |
| 9,535,255 B2* | 1/2017 | Huang | ...... | G02B 27/2214 |
| 9,766,472 B2* | 9/2017 | Cho | ...... | G02B 27/2214 |
| 9,930,322 B2* | 3/2018 | Hamagishi | ......... | H04N 13/317 |
| 2008/0079662 A1* | 4/2008 | Saishu | ...... | G02B 27/2214 345/55 |
| 2011/0157555 A1* | 6/2011 | Mashitani | ......... | G02B 27/2214 353/7 |
| 2012/0092763 A1* | 4/2012 | Song | ...... | G02B 27/2214 359/463 |
| 2012/0140142 A1* | 6/2012 | Lee | ...... | G02F 1/0136 349/61 |
| 2013/0057954 A1 | 3/2013 | Nakahara et al. | | |
| 2013/0069937 A1* | 3/2013 | Kim | ...... | G06F 3/0488 345/419 |
| 2013/0155054 A1* | 6/2013 | Lee | ...... | H04N 13/128 345/419 |
| 2013/0167092 A1* | 6/2013 | Yu | ...... | G06F 3/017 715/849 |
| 2013/0170004 A1* | 7/2013 | Futterer | ......... | G02B 6/0046 359/9 |
| 2014/0043448 A1* | 2/2014 | Lee | ...... | G09G 3/003 348/51 |
| 2014/0063015 A1* | 3/2014 | Cho | ...... | G02B 27/2214 345/426 |
| 2014/0071118 A1* | 3/2014 | Tyler | ...... | G02B 26/001 345/419 |
| 2014/0092329 A1* | 4/2014 | Odake | ......... | G02B 27/2214 349/15 |
| 2014/0111854 A1* | 4/2014 | Kroon | ...... | G02B 27/2214 359/463 |
| 2015/0049266 A1* | 2/2015 | Muller | ...... | G02B 27/2214 349/15 |
| 2016/0073097 A1* | 3/2016 | Hamagishi | ......... | H04N 13/317 348/59 |
| 2016/0131825 A1* | 5/2016 | Harrold | ...... | G02B 6/00 362/613 |
| 2016/0142704 A1* | 5/2016 | Hamagishi | ......... | H04N 13/376 348/59 |
| 2016/0313695 A1* | 10/2016 | Futterer | ...... | G02B 6/0046 |
| 2017/0003513 A1* | 1/2017 | Cho | ...... | G02B 27/2214 |
| 2017/0212369 A1* | 7/2017 | Kim | ...... | G09G 3/003 |

FOREIGN PATENT DOCUMENTS

| | | | | |
|---|---|---|---|---|
| CN | 203 930 226 | | 11/2014 | |
| TW | 201218452 A1 | | 5/2012 | |
| WO | WO-2007027220 A2 * | | 3/2007 | ........... G06K 7/0008 |
| WO | WO-2007027220 A2 * | | 3/2007 | |

* cited by examiner

AUTOSTEREOSCOPIC PIXEL EMITTING UNIT AND AUTOSTEREOSCOPIC DISPLAY DEVICE

CROSS REFERENCE TO RELATED APPLICATIONS

The present application is a 35 U.S.C. § 371 National Phase conversion of PCT/CN2015/000417, filed Jun.16, 2015, which claims benefit of Chinese Application No. 201410269115.0, filed Jun.17, 2014, the disclosures of which are incorporated herein by reference. The PCT International Application was published in the Chinese language.

FIELD OF THE INVENTION

This invention relates to an autostereoscopic display (3D) field, especially an autostereoscopic pixel emitting unit and autostereoscopic display device.

BACKGROUND OF THE INVENTION

In the field of autostereoscopic display technology, the existing technologies are divided into glass type and autostereoscopic display technology. For autostereoscopic display technology, the lenticular lens and parallax barrier are adopted by most of the display products.

With the development of new generation panel display technology and information technology, the smart, large-size, 4K and LCD TVs have gradually become the mainstream products of flat-panel TV market. The 4K and even 8K TV compensates the loss of resolution ratio for 3D display so as to become the display carrier providing more distinct images, new vision and new visual experiences for the viewers. The lately launched CUHD TV improves the flat plane display technology and aims to express the image on the edges of the displayer more accurately and delicately so as to experience the vividness of large-scale and high definition LCD TV. Therefore, the rapid development of HD display hardware technology makes the application of autostereoscopic display technology to fields of advertising, video games, architecture, medical treatment, military and education more prospective.

In general, autostereoscopic display technology needs to present stereoscopic images matching with LCD panel. The LCD panel not only has complex manufacturing process and high cost, but also needs high pixel alignment and assembly accuracy. Especially for large-size products, the autostereoscopic display products matching with lenticular lens have relatively high reject ratio and manufacturing and assembly costs. Besides, as restricted by size during manufacturing process, the LCD panel and lenticular lens cannot be increased the display area of the product unlimitedly. Especially the stereoscopic images larger than 100 inch (such as larger-size and wider-view angle application in cinema and outdoor plaza) can reach the view area by splicing video walls. However, the overall images integrated by splicing displays will surely show the trace of out frame joints (black frame and seam line). Moreover, it is unsuitable for long-distance view due to the brightness. If the external lens is used to present 3D visual effect, the visual barrier of black frame lines generated in joints will be surely deteriorated and the brightness will be reduced to the disadvantage of distinctiveness of overall frame. For viewers who expect to watch the clear stereoscopic images, the vivid experience will be reduced. This is the loss of the so-called seamless splicing video wall for large-scale display.

The counterpoint between lenticular lens and LCD panel must be accurate to is make pixel effectively constitute binocular parallax image and lead to the eyes of viewers so that the brain can blend the images and generate stereoscopic impression. The lens array can be finished by high precision manufacturing equipment. The yield is hard to be improved obviously, leading to great increase of the product cost burden and to the disadvantage of product application and popularization. Moreover, the fixed mode of lens and known display may derive defects such as difficult maintenance, and non-environmental debris. Besides, the autostereoscopic image display technology, in which the entire lens are outside hanged in front of the display plane, is restricted on the same plane. The lens array is made in curved surface, and the multi-view image presentation technology and application has difficulties. Therefore, neither the planes made by glass nor other materials can easily realize large-area screen or convexity, concavity or free-form surface display screen, greatly restricting the practical LCD display application and product design flexibility as well as expansibility of series products.

Different from LCD display backlight panel, the large-size LED display screen everywhere applies LED self-illumination and rich and saturated colors to constitute the LED arrays to display unit module (or box). According to purposes and requirements of indoor/outdoor installation sites, several display unit modules can be spliced to vast area display screen with different sizes or shapes (convex or indent arc) to present words, graphs, cartoons and videos. Although the large-size display screen is spliced by LED display boxes, the LED arrays are arranged on circuit board directly to form large area without being fixed by any frames. When displaying, the seam between display units (body) can almost not been distinguished. Therefore, the overall image on the screen is complete and distinct. Because the seamless splicing of large area, the LED display screen becomes the most suitable carrier for public information release such as advertising, entertainment and sports. Compared with splicing video wall and projection, LED display screen has distinct color, high brightness and is suitable for more people and long distance. Therefore, LED display screen is irreplaceable in indoor or outdoor public venue with large-size (large-area display) screen.

Nowadays, LED display screen is gradually developing the small distance products. The resolution ratio can reach the high definition or ultrahigh definition display effect. However, the contents displayed are in 2D or glass-type 3D. As above mentioned, although the LCD panel successfully realized autostereoscopic display by means of lenticular lens or parallax barrier, the LED display screen pixel arrangement method is different from that of LCD panel, so such external optical lens technology is unsuitable to be applied to outdoor or indoor large-size LED display screen directly. The main problems are: LED display screen pixel array is difficult to align at optical lens position, the huge screen and curved or special type LED display screen is more different to realize. Besides, after the display area is enlarged, it is easy to generate error accumulation of LED light exiting and lens guide direction to lower resolution ratio and 3D image display effect, or generate interference strips or distorted images. If the large size display range will be reached by video walls spliced by known LCD panels, finally the overall screen will be integrated by separating lenticular lens or parallax barrier into same-size blocks. Therefore, the external lens of each block needs to be spliced and fixed, so it is necessary to generate the same problems of splicing LCD video walls, i.e. the black lines of lens seams For huge LED display screen, although the high-cost and large-size external lens is adopted to realize autostereoscopic display screen, the thin large-size lens grating will surely face other problems such as material intensity, flatness, fixing method, safety, installation, maintenance, aging and service life.

Based on above-mentioned problems and defects, the technological innovation of the intention is to provide a kind of autostereoscopic pixel emitting unit and autostereoscopic display device comprised of pixel emitting units. The autostereoscopic display unit shall be minimized to the level of parts, so the autostereoscopic pixel emitting units can be constituted display unit module or box according to purposes and requirements of indoor/outdoor installation sites, and several display unit modules can be spliced to vast area display screen with different sizes or shapes (convex, indent arc or free-form surface) to present is words, graphs, cartoons and videos without installing optical lens in parallel with display screen, and fully free from lens panel size restriction. The display surface required by free expansion can be spliced seamlessly. The display screen structure is flexible for product design, and can switch the 2D and autostereoscopic display or regionally display 2D and autostereoscopic contents.

DISCLOSURE OF THE INVENTION

The invention provides an autostereoscopic pixel emitting unit and autostereoscopic display device comprised of autostereoscopic pixel emitting units to display 3D image or video. Aiming at the external large-size parallax barrier and lenticular lens in parallel with display panel in current technology as well as technical barriers and derived problems of autostereoscopic image presentation, the invention provides an effective resolution to truly realize any size, seamless splicing and free-form surface autostereoscopic display screen.

To achieve the above-mentioned objective, the present invention provides an autostereoscopic pixel emitting unit, it comprises: at least a group of sub-pixel units, and each sub-pixel unit at least contains a red light-emitting unit, a green light-emitting unit and a blue light-emitting unit; an optical package, which covers the sub-pixel unit and at least contains an optical guide area and a mixing light area; the mixing light area mixes the light emitted from the sub-pixel unit in the optical package through reflection, refraction or total reflection and guide the light to the optical guide area, each optical guide area corresponds to a sub-pixel unit, and the optical guide area deflect and gather the light emitted from the sub-pixel unit to different directions, or block part of the light, and then leads the light outside the optical package so that the pixel unit can constitute binocular parallax images which will be sent to both eyes and be felt by the brains of the viewers, the stereoscopic images is then formed; and at least a circuit board, on which the sub-pixel unit is set and connected electrically with the said board.

Further, the autostereoscopic pixel emitting units are arranged adjacently in lines and columns on the circuit board to constitute a minimal rectangle module so that the optical guide areas form integrated and continuous light-exiting surface, similarly with lenticular lens or parallax barrier. The refraction of lenticular lens make the autostereoscopic pixel emitting units constitute binocular parallax images effectively so that the brains can cognize, form stereoscopic image and generate the stereoscopic impression. Or, since the parallax barrier can block some light, the adjacent pixel emitting units transmit or non-transmit the lights, autostereoscopic pixel emitting units can constitute binocular parallax images so that the brains cognize, form stereoscopic images and generate stereoscopic impression. The autostereoscopic display device comprised by autostereoscopic pixel emitting units is characterized in that the autostereoscopic pixel emitting units are arranged tightly by the same horizontal and vertical distance on the heat sink device to comprise a minimal rectangle module and all the optical guide areas comprise integrated and continuous lenticular lens or parallax barriers so that the autostereoscopic pixel emitting units can effectively comprise binocular parallax images and project to both eyes of the viewers to form stereoscopic images after brains cognized and blended.

The autostereoscopic display device is arranged on system heat sink device or screen fixing frame according to matrix to form large-size display surface so as to display the multi-view stereoscopic images rendered by system control software. Because it needs no external optical lens, it can realize free and seamless splicing of any large size, and can truly distinctly display the complete autostereoscopic display image.

Further, the optical guide area of autostereoscopic pixel emitting unit is designed as compound grating, which can not only provide optimal stereoscopic display effect, but also can use various sizes of autostereoscopic pixel emitting units to constitute autostereoscopic display screen between different installation gaps according to environment requirements of different venues. It has characteristic of low materials and manufacturing cost.

Further, the autostereoscopic pixel emitting unit can match with full color light-emitting diodes, they are respectively arranged on circuit board adjacently or respectively constitute different rectangular modules to set different modules as 2D or 3D display area. The mixed and blended large-size display screen can switch 2D or 3D display, or present 2D or 3D words, graphs, cartoons and videos by different resolution in different display surfaces.

Furthermore, the autostereoscopic large-size display screen and system contains multi-view autostereoscopic pixel emitting units, display device body, content display device and content storage device. The content display device is connected to the autostereoscopic pixel emitting unit through data signal circuit, and receives and decodes the image data with 3D information, and sends the decoded multi-view image signals to the autostereoscopic pixel emitting unit; the content storage device is connected to the content display device through data communication circuit, and stores the image data with 3D information and sends the 3D information-contained image data to the content display device through data communication circuit.

Compared with the existing technology which needs external large-size parallax barrier and lenticular lens in parallel with display panel to realize autostereoscopic display technology, this invention, aiming at the defects and insufficiencies of existing LCD display and LED display screen products, discloses an autostereoscopic pixel emitting unit and the multi-view autostereoscopic display device comprised of the autostereoscopic pixel emitting units, which can realize free expansion of large size display area and seamless and distinct display of complete autostereoscopic image or videos without hanging external full slice grating.

Compared with the existing technologies, the priorities of the autostereoscopic pixel emitting unit and the multi-view autostereoscopic display device in this invention is that it breaks the framework of traditional FPD panel and provides a small-sized autostereoscopic pixel emitting unit and the multi-view autostereoscopic display device comprised of the autostereoscopic emitting pixel units, which can, without changing the system structure of traditional LED 2D display screen and product assembly process, according to different purpose and requirements of indoor/outdoor installation sites, constitute the autostereoscopic pixel emitting units to display unit module or box, and splice several display modules into large-size display screen with different sizes or shapes, such as convex, indent arc or free formed curve surfaces without installing optical lens in parallel with display screen, and fully free from lens panel size restriction. The display surface required by free expansion can be spliced seamlessly. It regionally display 2D and autostereoscopic contents or can switch the 2D and 3D display in the same display area. The display is of simple structure, flexible product design and expandable series products. It can effectively solve the technical barriers and derived costs, quality, assembly, maintenance, service life and safety problems of large-size display panel, realize any large size plane or free-form surface display screen, easy horizontal, vertical, diagonal installation or in any directions without problems of safety and glass breaking. It is an autostereoscopic display screen which can distinctly, vividly and seamlessly show the overall picture.

DESCRIPTION OF EMBODIMENTS

A detail description of the preferred embodiments of the invention is provided below along with the drawings.

Figure 1:
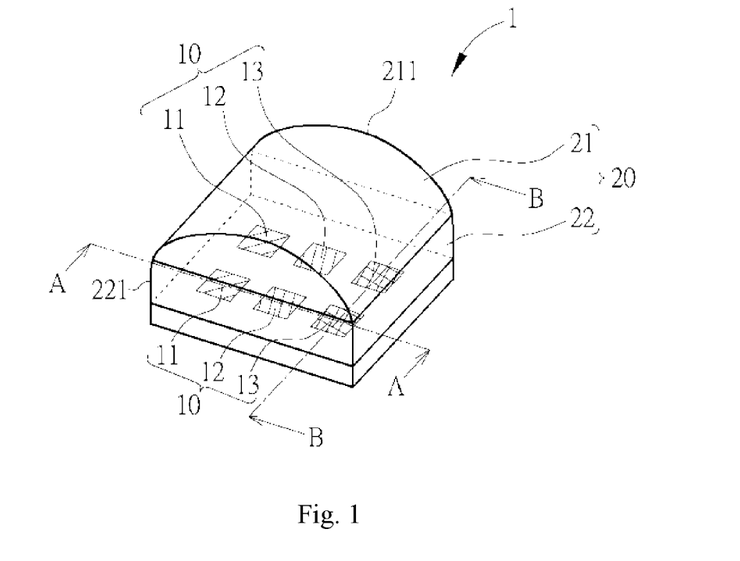
FIG. 1 is the schematic drawing of autostereoscopic pixel emitting unit of an embodiment of the present invention.
Figure 1A:
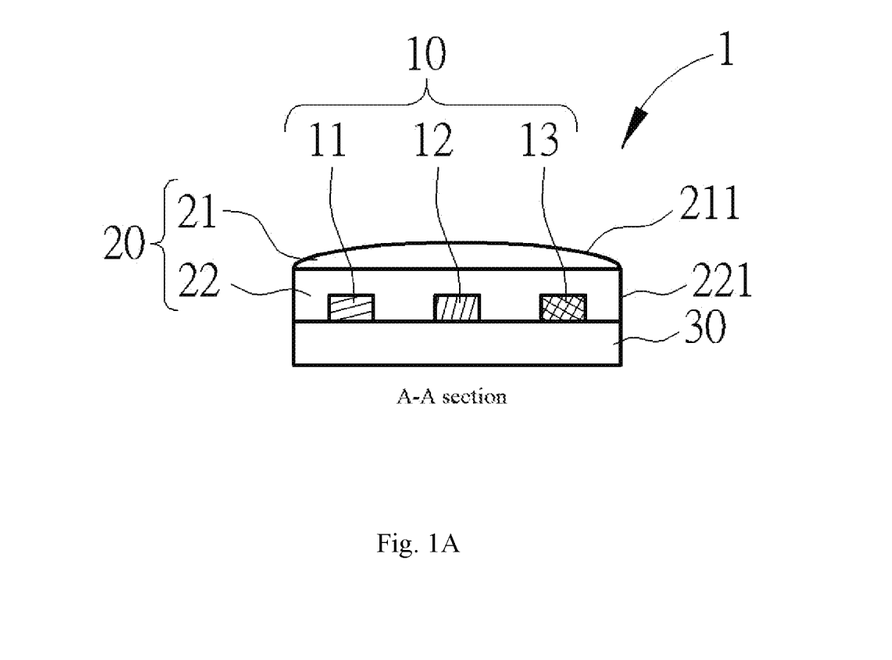
FIG. 1A is the cross-sectional view of FIG. 1 along line A-A.
Figure 1B:
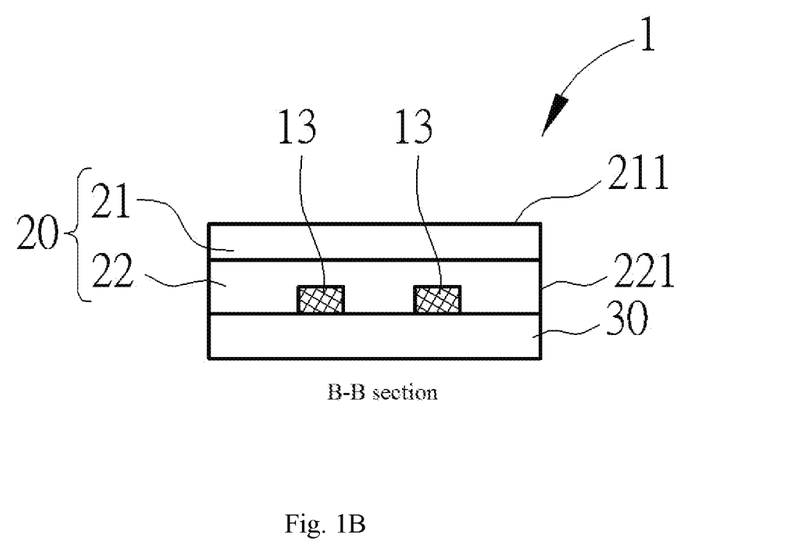
FIG. 1B is the cross-sectional view of FIG. 1 along line B-B.
Figure 2:
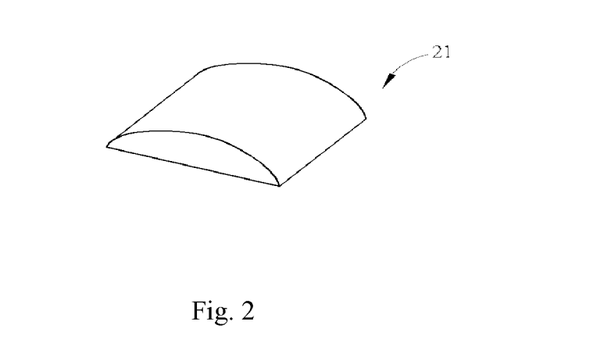
FIG. 2 is the schematic drawing of optical guide area of FIG. 1.
Figure 3:
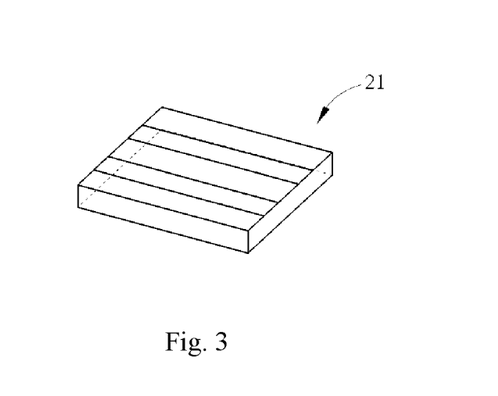
FIG. 3 is the schematic drawing of another optical guide area of FIG. 1.

As indicated from FIG. 1 to FIG. 3, FIG. 1 is the schematic drawing of autostereoscopic pixel emitting unit of the embodiment of the present invention; FIG. 1A is the cross-sectional view of FIG. 1 along line A-A ; FIG. 1B is the cross-sectional view of FIG. 1 along line B-B; FIG. 2 is the schematic drawing of optical guide area 21 of FIG. 1; FIG. 3 is the schematic drawing of another optical guide area 21 of FIG. 1. As shown in FIG. 1 and combining FIG. 1A and FIG. 1B, the autostereoscopic pixel emitting unit 1 at least comprises a group of sub-pixel units 10, at least an optical package 20 and at least a circuit board 30. Each sub-pixel unit 10 at least contains a red light-emitting unit 11, a green light-emitting unit 12 and a blue light-emitting unit 13. The optical package 20 covers the sub-pixel unit 10, and further contains at least an optical guide area 21 and at least a mixing light area 22. The mixing light area 22 can mix the lights emitted from sub-pixel unit 10 in optical package 20 by means of reflection, refraction or full reflection and guide the lights to optical guide area 21. Each optical guide area 21 corresponds to a sub-pixel unit 10. The optical guide area 21 can deflect and gather the lights emitted from sub-pixel unit 10 to different directions or block part of the light, and then lead the lights outside optical package 20, so that the autostereoscopic pixel emitting unit 1 can constitute binocular parallax images which will be sent to both eyes and be felt by the brains of the viewers, the stereoscopic images is then formed. The optical guide area 21 has a light-exiting surface 211, which is away from the sub-pixel unit 10.

Further, the present invention can use micro lens design and manufacture technology to apply lenticular lens, parallax barrier or other optical lens design to is optical guide area 21. In this embodiment, the optical guide area 21 and the mixing area 22 can be made up of different materials, or formed integrally by the same material, and adjusted and designed according to the manufacturing process or requirement for display effect. As shown in FIG. 2 and FIG. 3, the light-exiting surface 211 of the optical guide area 21 can be a plane, a slope, a curved surface or a double-layer combination, such as lenticular lens or parallax barrier structure, which is used to guide the lights emitted from sub-pixel unit 10 to different directions or block part of the light. The sub-pixel unit 10 is set on circuit board 30, and connected to circuit board 30 electrically. In actual application, the passive components (such as resistance, inductance and capacitance) and/or active components (such as transistor, etc) may be set on circuit board 30 to provide power for operation of autostereoscopic pixel emitting unit 1.

Furthermore, in order to increase more colors and wider color gamut display, each sub-pixel unit 10 can further comprise a yellow light-emitting unit or an orange light-emitting unit, the yellow light-emitting unit or orange light-emitting unit may be adjacent to the red light-emitting unit 11, green light-emitting unit 12 and blue light-emitting unit 13.

Besides, the above-mentioned red light-emitting unit 11, green light-emitting unit 12 and blue light-emitting unit 13 of autostereoscopic pixel emitting unit 1 can individually adjust its brightness, color and light-emitting blink rate through the outside controller. The autostereoscopic pixel emitting unit 1 can further comprise an organic light-emitting diode (OLED) or inorganic light-emitting diode, such as organic light-emitting material or III-V compound semiconductor materials, etc.

The mixing light area 22 in FIG. 1 has at least a side surface 221, which is close to the sub-pixel unit 10, and the side surface 221 has the effect of reflection, refraction or full reflection, and is able to lead the light emitted from sub-pixel unit 10 outside the light-exiting surface 211 of optical guide area 21.

The materials of optical package 20 in FIG. 1 may contain polycarbonate (PC), polymethyl methacrylate (PMMA), resin, silicon, glass and epoxy, which can take shape by thermosetting or ultraviolet light setting, and optical package 20 is hollow or solid.

The shapes of sub-pixel unit 10 of autostereoscopic pixel emitting unit 1 in FIG. 1 may be a rectangle, a round, a triangle or any other polygon. The present invention can change the shapes of autostereoscopic pixel emitting unit 1 according to different needs and designs, or increase the number of optical guide area 21 to comply with requirements for 3D display effect.

Figure 4:
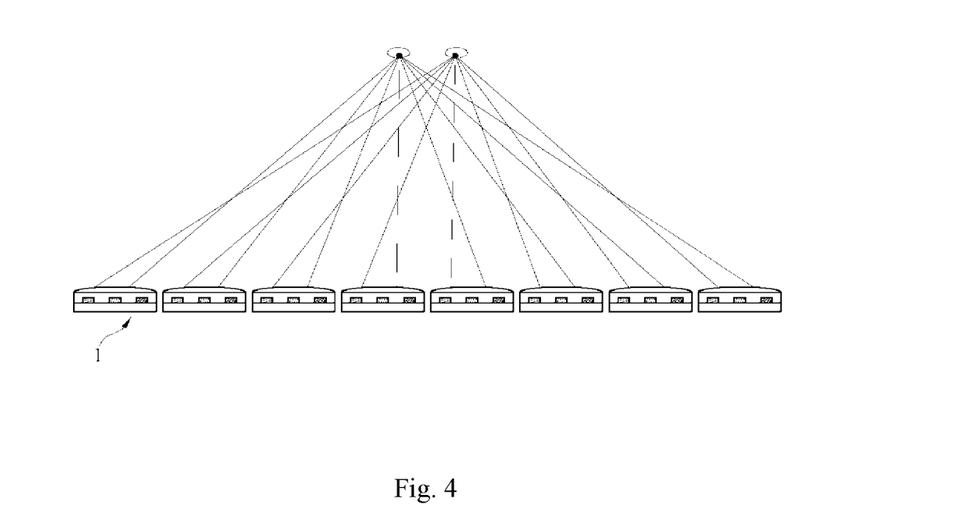
FIG. 4 is the schematic drawing of lenticular lens displaying autostereoscopic images.

FIG. 4 is the schematic drawing of lenticular lens autostereoscopic display images. Lenticular lens is the strip plano-convex lens structure arranged in parallel and with repetition periodically. Each lenticular will separate the images of left and right eyes into strips, and after transmission through plano-convex arranged in order, the related strip images from other lenticular to constitute the binocular parallax images and rearrange to a new image. Both eyes of the viewers will be lead, and the brains cognize information and composite stereoscopic images so as to generate stereoscopic impression.

Figure 5:
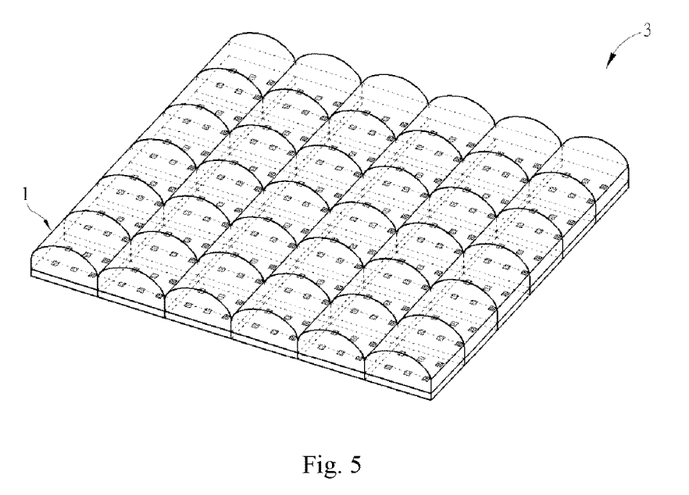
FIG. 5 is the schematic drawing of autostereoscopic display device comprised of autostereoscopic pixel emitting units according to an embodiment of the present invention.

FIG. 5 is the schematic drawing of autostereoscopic display device 3 comprised of autostereoscopic pixel emitting units 1 according to embodiment of the present invention. The autostereoscopic pixel emitting units 1 will be arranged in lines and columns on circuit board 30 and heat sink devices (not shown in Fig.) adjacently to constitute a minimal rectangular module to constitute an autostereoscopic display device 3. The optical guide area 21 hence forms integrated and continuous lenticular lens light-emitting lens. The refraction of lenticular lens makes the sub-pixel unit 10 effectively constitute binocular parallax images and respectively project to the light and right eyes of the viewers. The brains cognize information and composite stereoscopic image so as to generate stereoscopic impression. In this embodiment, several autostereoscopic pixel emitting units 1 are arranged tightly with same horizontal and vertical gap. All optical guide areas 21 constitute integrated and continuous lenticular lens to make sub-pixel units 10 effectively composite binocular parallax images, and project to the light and right eyes of the viewers. The brains cognize information and composite stereoscopic images. To realize lenticular lens focal surface and display screen image surface coincidence, the thickness of light-exiting surface 211 of optical guide area 21 can be adjusted according to the size of autostereoscopic pixel emitting unit 1 to change the focal position of lenticular lens.

Figure 6:
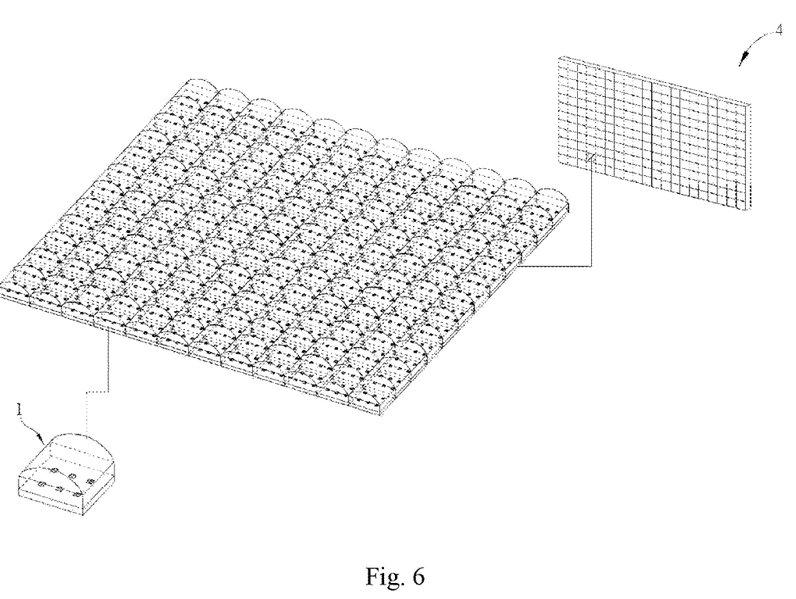
FIG. 6 is the schematic drawing of autostereoscopic display screen system comprised of autostereoscopic pixel emitting units according to an embodiment of the present invention.

FIG. 6 is the schematic drawing of autostereoscopic display screen system 4 comprised of autostereoscopic pixel emitting units 1 according to embodiment of the present invention. As shown in FIG. 6, the autostereoscopic display device 3 is arranged on system heat sink device or screen fixing framework by matrix to form large-size display area, and constitute integrated large-size autostereoscopic display screen system 4 which can display multi-view stereoscopic images rendered by display system software. The autostereoscopic pixel emitting unit 1 shall be minimized to level of parts, so the autostereoscopic pixel emitting unit 1 needs no external optical lens and is totally free from lens panel size restriction. Therefore, it can be spliced to any size of display area seamlessly required by expansion, installed at any directions and able to truly, distinctly and integrally display 3D images.

The periodical interference between lenticular lens and pixel array generates the problem of uneven brightness and forms the so-called moiré phenomenon, which may generate undesirable visual effect to stereoscopic images and break the ornamental value of the image. Philips proposed in U.S. Pat. No. 6,064,424 that the tilting lenticular lens is the effective solution. When the lenticular dines to a certain angle, the resolution along original horizontal direction will reduce and transfer to vertical resolution, and meanwhile increase the number of views of display device.

The autostereoscopic pixel emitting unit 1 in present invention needs not the tilting lenticular lens. As long as the sub-pixel units 10 are arranged with certain inclination angle, the overall light-exiting surface formed can reach the effect of tilting lenticular lens so as to make brightness even and greatly reduce moiré phenomenon. Meanwhile, the difference between horizontal resolution and is vertical resolution can be reduced to improve the definition of stereoscopic display.

Figure 7:
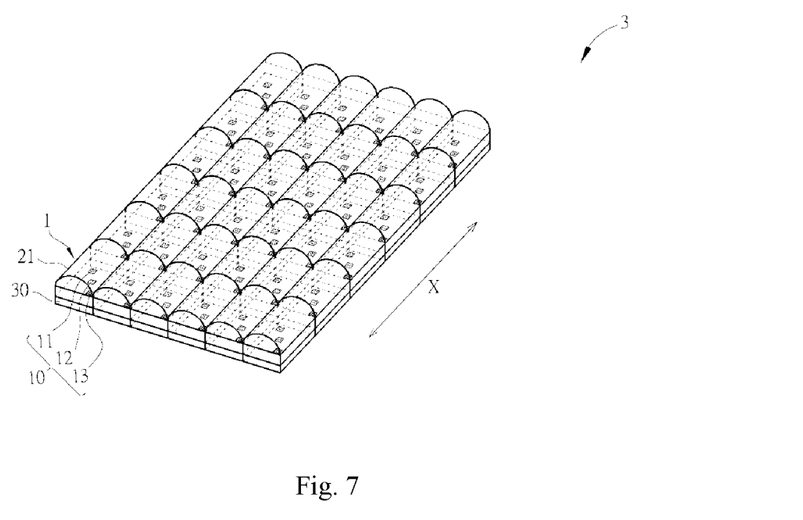
FIG. 7 is the schematic drawing of autostereoscopic display device comprised of diagonally arranged sub-pixel units of the autostereoscopic pixel emitting units according to an embodiment of the present invention.

FIG. 7 is the schematic drawing of autostereoscopic display device module comprised of rearrangement sub-pixel units 10 of the autostereoscopic pixel emitting units 1 according to embodiment of the present invention. As shown in FIG. 7, the red light-emitting unit 11, the green light-emitting unit 12 and the blue light-emitting unit 13 of sub-pixel unit 10 of autostereoscopic pixel emitting unit 1 are arranged at an angle with mirror axle X, and several autostereoscopic pixel emitting units 1 are arranged in lines and aligned with each other. The different colors of light-emitting units diagonal arrangement of autostereoscopic pixel emitting unit 1 in this embodiment can reach the following advantages: 1) be able to reduce moiré phenomenon, and meanwhile improve definition of stereoscopic display; 2) be able to increase number of views of display device because the horizontal resolution may be reduced and transferred to vertical resolution; 3) be able to generate 3D optimal visual effect vertically and reach all-sight view rather than limited to left or right stereoscopic images; and 4) need no tilting lenticular lens; different stereoscopic image display effects can be reached by configuration and adjustment of different colors of light-emitting units for different declination angles, which is in favor of development of more products series and application.

The basic principle of parallax barrier displaying stereoscopic imagines is that the light transmitting part and light blocking part comprising grating baffle alternatively and continuously. Due to the blocking of baffle, the viewers can see a series of pixels on the display panel through the narrow strip of optical grating. For instance, the right eye can only see the even column pixel rather than odd column pixel while the left eye can only see the odd column pixel rather than the even column pixel. Therefore, the pixel columns can effectively constitute binocular parallax images, and through blending, the brains can perceive the depth and form stereoscopic images.

Figure 8:
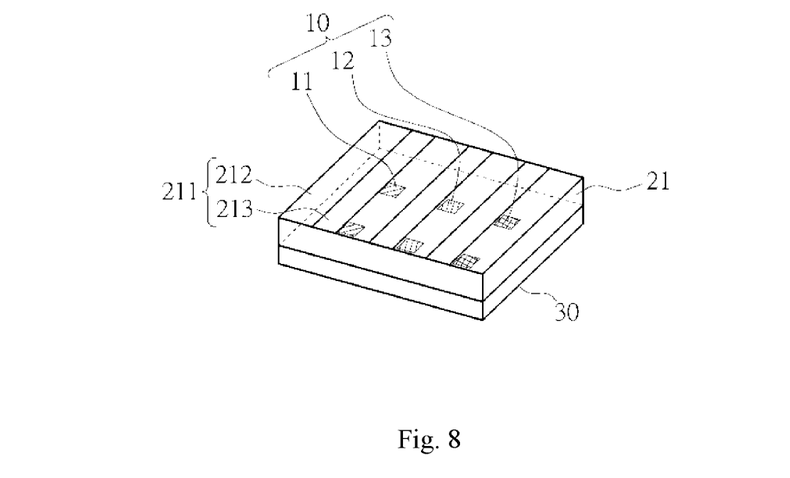
FIG. 8 is the stereogram drawing of autostereoscopic pixel emitting unit, which adopts parallax barrier in the optical guide area according to an embodiment of the present invention.
Figure 9:
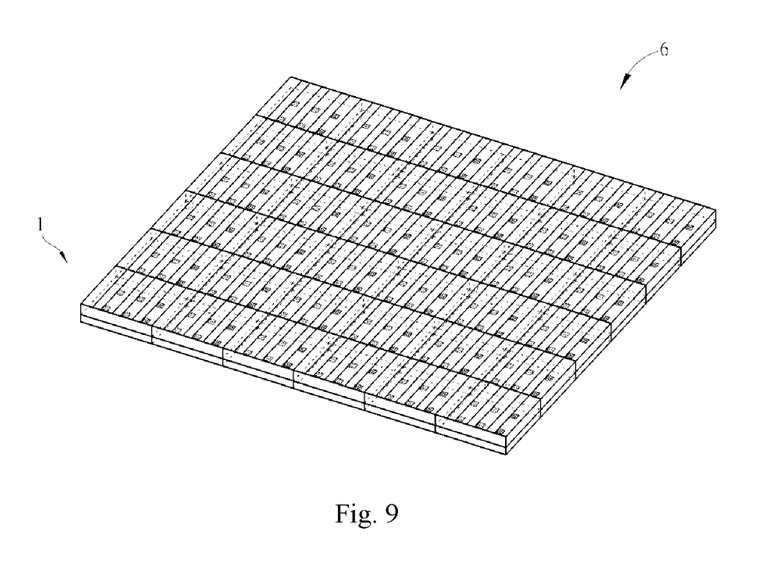
FIG. 9 is the schematic drawing of autostereoscopic display device comprised of autostereoscopic pixel emitting units of FIG. 8 which adopting parallax barrier according to an embodiment of the present invention.

As shown in FIG. 8 and FIG. 9, FIG. 8 is the stereogram view of the autostereoscopic pixel emitting units 1, which adopts parallax barrier in the is optical guide area according to embodiment of the present invention; FIG. 9 is the schematic drawing of autostereoscopic display device 6 comprised of autostereoscopic pixel emitting units 1 in FIG. 8 which adopting parallax barrier according to embodiment of the present invention. The optical guide area 21 has a light-exiting surface 211, which is away from sub-pixel unit 10, the light-exiting surface 211 of optical guide area 21 is of parallax barrier structure comprised of transmitting part 212 and blocking part 213. The sub-pixel units 10 of autostereoscopic pixel emitting unit 1 will be arranged evenly from up to down with the same gap according to the matching relation between parallax barrier and 3D display optical parameters. The sub-pixel units 10 are arranged in this way adjacently on circuit board 30 to form a minimal rectangle module. The optical guide areas 21 are hence formed continuous light-exiting surface to form overall parallax barrier which is the autostereoscopic image display device 6 comprised of autostereoscopic pixel emitting units 1 in the embodiment. As shown in FIG. 9, several autostereoscopic pixel emitting units 1 form granting baffle. Due to the blocking of baffle, the viewers can see a series of pixels on the display panel through the narrow strip of optical grating. For instance, the right eye can only see the even column pixel rather than odd column pixel while the left eye can only see the odd column pixel rather than the even column pixel. Therefore, the pixel columns can effectively constitute binocular parallax images, and through blending, the brains can perceive the depth and form stereoscopic images.

Figure 10:
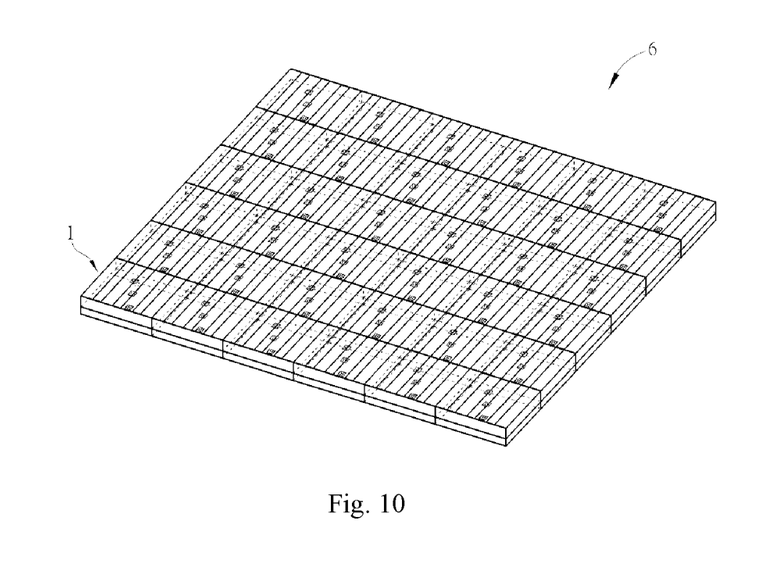
FIG. 10 is the schematic drawing of parallax barrier autostereoscopic display device comprised of diagonally arranged sub-pixel units of the autostereoscopic pixel emitting units according to an embodiment of the present invention.

FIG. 10 is the schematic drawing of parallax barrier autostereoscopic display device comprised of diagonally arranged sub-pixel units 10 of the autostereoscopic pixel emitting units 1 according to embodiment of the present invention. In order to effectively reduce moiré interference, change the relative position arrangement of the sub-pixel unit 10 of autostereoscopic pixel emitting unit 1 in the present invention and the optical grating, another embodiment can be made without tilting parallax barrier. The sub-pixel unit 10 is configured at an angle to reach titling optical grating effect so as to reduce interference and improve definition. As shown in FIG. 10, the present display device in this embodiment of the present invention will arrange the sub-pixel units 10 diagonally to form parallax barrier integrally.

Figure 11:
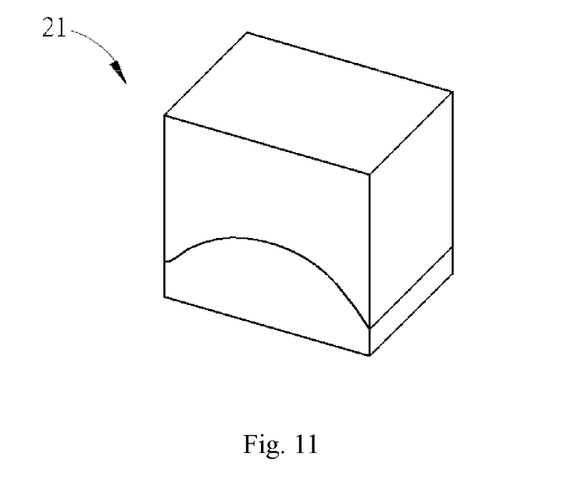
FIG. 11 is the schematic drawing of the optical guide area which adopts combined lenticular lens design according to an embodiment of the present invention.

FIG. 11 is the schematic drawing of the optical guide area of the autostereoscopic pixel emitting unit 1, which adopts combined lenticular lens design according to embodiment of the present invention. As shown in FIG. 11, the optical guide area 21 can be tightly bonded or coupled by optical materials with two kinds of different refraction indexes. In general, the focal length of combined lenticular lens is larger than single lenticular lens focal length with corresponding structural size. The proper selection matching with coupling lenticular lens material refraction index can combine to realize compound lenticular lens with different focal length. As required by different venue environment, the autostereoscopic pixel emitting units with different sizes can form autostereoscopic display screen with different installation gap with characteristics of low materials and manufacturing costs.

Figure 12:
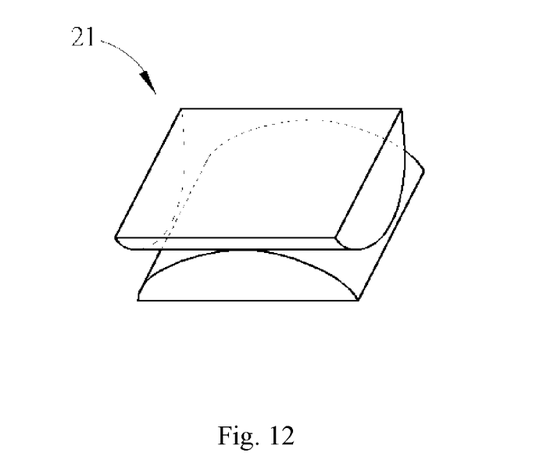
FIG. 12 is the schematic drawing of the optical guide area which is assembled by vertically crossing of two plano-convex lenticular lens according to an embodiment of the present invention.

FIG. 12 is the schematic drawing of the optical guide area 21 of the autostereoscopic pixel emitting unit 1, which is assembled by vertically crossing of two plano-convex lenticular lens according to embodiment of the present invention. As shown in FIG. 12, the optical guide area 21 can simultaneously provide horizontal and vertical parallax image to optimize the image deep information and stereoscopic impression. Or as above-mentioned, sub-pixel unit 10 can be vertically or diagonally arranged or otherwise select matched coupling lenticular lens material refraction index to combine to realize compound lenticular lens with different focal lengths.

Figure 13:
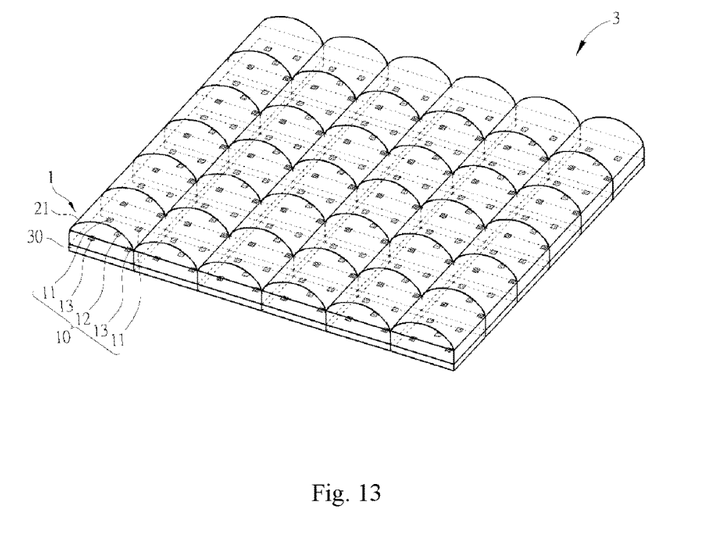
FIG. 13 is the schematic drawing of autostereoscopic pixel emitting unit, in which the optical guide area covers five sub-pixel units arranged cross banding according to an embodiment of the present invention.

FIG. 13 is the schematic drawing of autostereoscopic pixel emitting unit, in which the optical guide area covers five sub-pixel units arranged cross banding according to embodiment of the present invention. The optical guide area 21 is monolayer len design, and the display effect can be same as of the vertical combination of above-mentioned two plano-convex lenticular lenses. It has characteristics of simple manufacturing process and low material costs.

Figure 14:
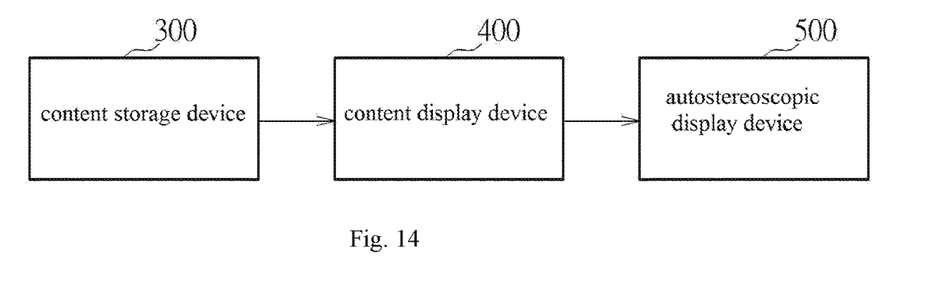
FIG. 14 is the schematic drawing of electrical functional blocks of autostereoscopic large-size display screen system.

FIG. 14 is the schematic drawing of functional blocks of autostereoscopic large-size display screen system, including multi-view autostereoscopic pixel emitting unit, display device module/box, content display device and content storage device. The content display device is connected to the autostereoscopic pixel emitting unit through data signal circuit, and receives and decodes the image data with 3D information, and sends the decoded multi-view image signals to the autostereoscopic pixel emitting unit; the content storage device is connected to the content display device through data communication circuit, and stores the image data with 3D information and sends the 3D information image data to the content display device through data communication circuit. The above-mentioned autostereoscopic display device 500 can further contain display device body (not shown in Fig.), and connect to content display device 400 and content storage device 300. The content display device 400 is connected to the autostereoscopic display device 500 through data signal circuit, and receives and decodes the image data with 3D or 2D information, and sends the decoded multi-view image signals to the autostereoscopic display device 500. The content storage device 300 is connected to the content display device 400 through data communication circuit, and stores the image data with 3D or 2D information and sends the 3D or 2D information image data to the content display device through data communication circuit. The 2D and 3D information image data can be sent to the same display area according to different times, or sent to different display areas at the same time, or by combined ways.

Figure 15:
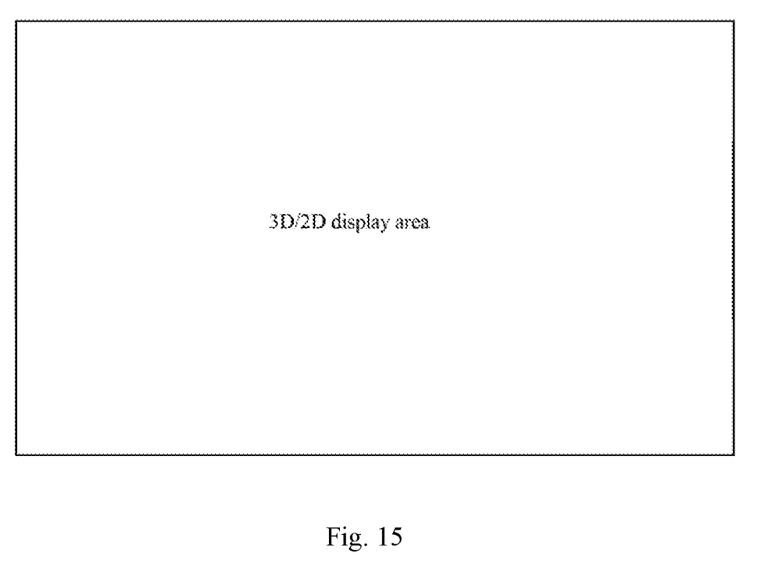
FIG. 15 is the schematic drawing of switchable 2D or 3D display screen comprised of autostereoscopic pixel emitting unit and full color LED according to an embodiment of the present invention.

FIG. 15 is the schematic drawing of switchable 2D or 3D display screen comprised of autostereoscopic pixel emitting unit with full color LED according to embodiment of the present invention.

The above-mentioned autostereoscopic display device further comprises a control system, which is used to control multi-view stereoscopic image display, can control different autostereoscopic pixel emitting units by groups (display unit module and box) or individually. In the embodiment, the autostereoscopic pixel emitting units match with full color LED, they are respectively arranged on circuit is board alternatively in lines and in columns to constitute display unit module and to assemble a large-size screen. The system can conduct 2D and 3D words and image display switch by alternative on or off of autostereoscopic pixel emitting unit and full color LED. When the full color LED is on, the autostereoscopic pixel emitting unit will be off At that moment, the screen displays 2D words and images. Otherwise, when autostereoscopic pixel emitting unit is on, the screen displays 3D words and images.

Figure 16:
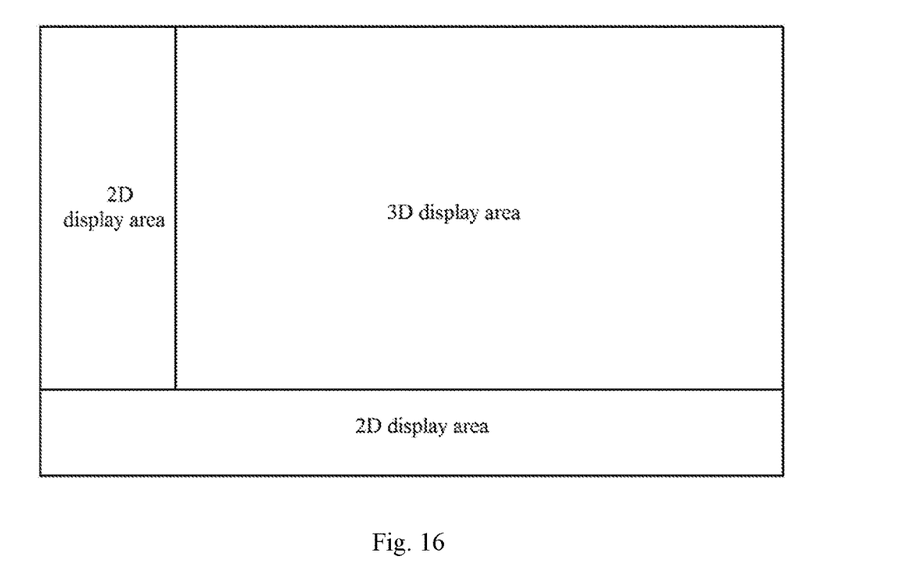
FIG. 16 is the schematic drawing of mixing 2D and 3D display screen comprised of autostereoscopic pixel emitting unit and full color LED according to an embodiment of the present invention.

FIG. 16 is the schematic drawing of mixing 2D and 3D display screen comprised of autostereoscopic pixel emitting unit and full color LED according to embodiment of the present invention. The present invention can arrange the autostereoscopic pixel emitting units in lines and columns on circuit board to constitute rectangular module and form 3D image display area. Besides, the full-color LEDs are arranged in lines and columns in different areas of circuit board to constitute rectangular modules and form 2D image display area. The above-mentioned control system can individually control the autostereoscopic pixel emitting units and full-color LED in different areas, and the entire display area can further be divided into three areas, as shown in FIG. 16, to form a large-size display screen. The middle-left and lower areas present 2D words and images, while the right upper area displays 3D words and images.

Figure 17:
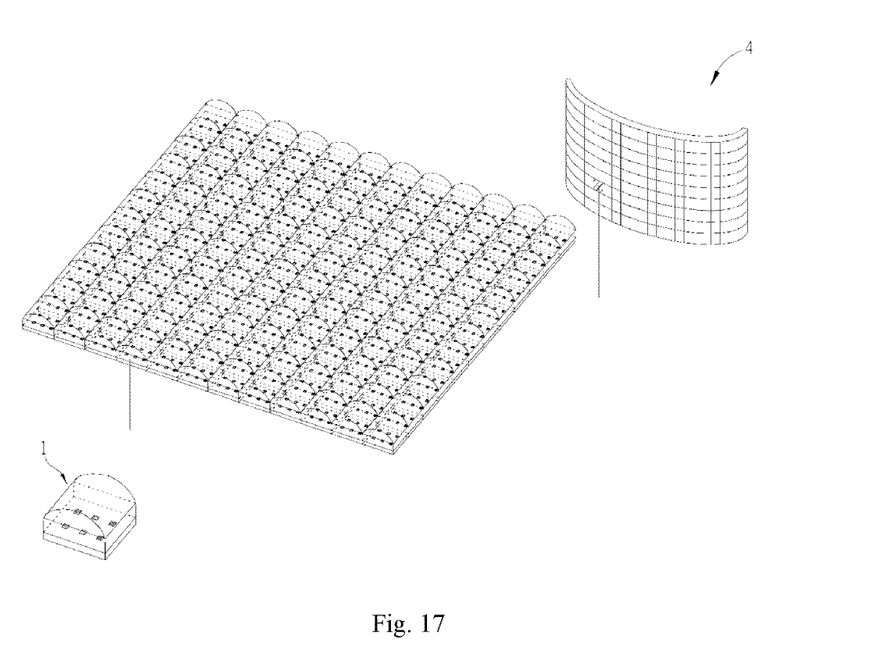
FIG. 17 is the schematic drawing of autostereoscopic pixel emitting unit with convex arc screen according to an embodiment of the present invention.

Further, the FIG. 17 is the schematic drawing of autostereoscopic pixel emitting unit with convex arc screen according to embodiment of the present invention. Several autostereoscopic pixel emitting units 1 will arranged adjacently on circuit board to constitute a minimal rectangular module. According to purpose and requirements of indoor/outdoor installation sites (length and width of rectangular module will be decided according to radius of curvature and scope of vision), several display unit modules can splice to huge-size seamless display screen with different convex shape or area size. The present invention can use tilt angle or turn the installation angle of autostereoscopic pixel emitting units with different lines or columns on the same plane to perfectly present vivid 3D image. Besides, several autostereoscopic pixel emitting units in is this embodiment can be used to constitute a convex large-size display screen, which can be used to switch between 2D and contents or display diversified 2D and 3D words, graphs, cartoons and videos in different display areas.

Figure 18:
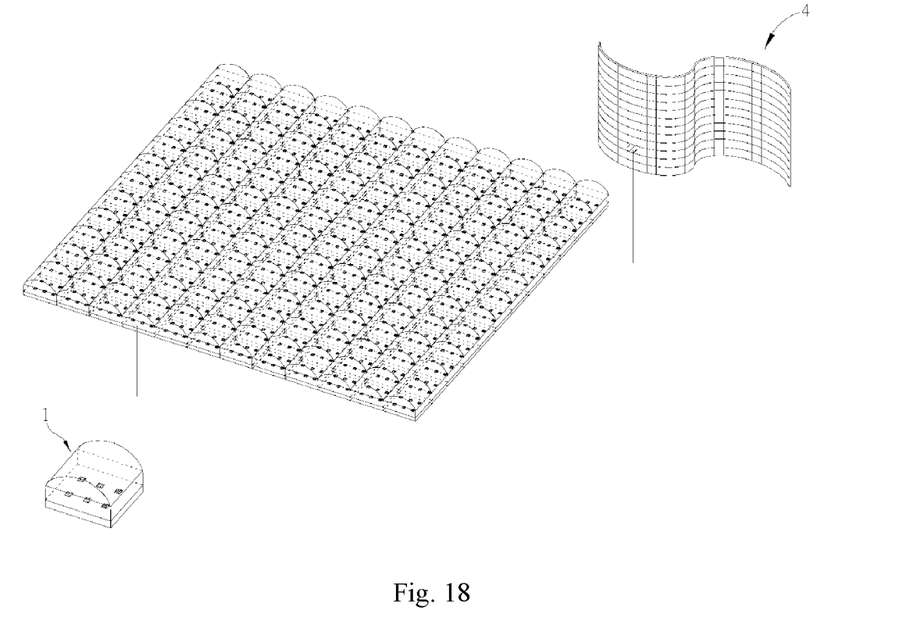
FIG. 18 is the schematic drawing of autostereoscopic pixel emitting unit with free formed curve screen according to an embodiment of the present invention.

FIG. 18 is the schematic drawing of autostereoscopic pixel emitting unit with free formed curve screen according to embodiment of the present invention. According to purpose and requirements of indoor/outdoor installation sites (length and width of rectangular module will be decided according to radius of curvature and scope of vision), in the present invention, several display unit modules can splice to huge-size seamless display screen with different convex shape or area size. The present invention can use tilt angle or turn the installation angle of autostereoscopic pixel emitting units with different lines or columns on the same plane to perfectly present vivid 3D image. Besides, several autostereoscopic pixel emitting units in this embodiment can be used to constitute a convex large-size display screen, which can be used to switch between 2D or 3D contents or present diversified 2D and 3D words, graphs, cartoons and videos in different display areas.

The above-mentioned embodiment is the preferred one of the invention, any equal changes and modifications based on the patent for invention shall belong to the scope of this invention.

The detail description of the preferred embodiments of the invention is provided, but the invention is not limited to the description. It is obvious that the person skilled in the art could make numerous modifications and alternatives after they read the above contents. Therefore, the scope of the present invention is limited only by the claims.

The invention claimed is:

1. An autostereoscopic pixel emitting unit comprises:
at least a group of sub-pixel units, each sub-pixel unit including a red light-emitting unit, a green light-emitting unit and a blue light-emitting unit;
an optical package, which covers the sub-pixel unit and includes an optical guide area and a mixing light area;
the mixing light area mixes the light emitted from the sub-pixel unit in the optical package through reflection, refraction or total reflection and guides the light to the optical guide area, each optical guide area corresponds to a sub-pixel unit, and the optical guide area deflects and gathers the light emitted to different directions, or blocks part of the light, and then leads the light outside the optical package to provide binocular parallax images which will be sent to both eyes of a user and be interpreted by a brain of the user as a stereoscopic images and
at least a circuit board, on which the sub-pixel unit is set and connected electrically with the said board.

2. The autostereoscopic pixel emitting unit of claim 1, wherein each sub-pixel unit further comprises a yellow light-emitting unit or an orange light-emitting unit.

3. The autostereoscopic pixel emitting unit of claim 1, wherein the mixing light includes at least a side surface which is close to the sub-pixel unit, and the side surface leads the light emitted from the sub-pixel unit to a light-exiting surface of the optical guide area.

4. The autostereoscopic pixel emitting unit of claim 1, wherein, a side surface of said mixing light area reflects or refracts the light.

5. The autostereoscopic pixel emitting unit of claim 1, wherein, the optical guide area includes at least a light-exiting surface, which is positioned away from the sub-pixel unit.

6. The autostereoscopic pixel emitting unit of claim 5, wherein, the light-exiting surface of said optical guide area is a plane, a slope, a curved surface or a double-layer combination, and a micro lens design and manufacture technology is used such that a the lenticular lens or parallax barrier are applied in the optical guide area so as to lead the light emitted from the corresponding sub-pixel unit in different directions, or to block part of the light.

7. The autostereoscopic pixel emitting unit of claim 1, wherein, said optical package is made of one or more of polycarbonate, polymethyl methacrylate, resin, silicon, glass, or epoxy resin, and is hollow or solid.

8. The autostereoscopic pixel emitting unit of claim 1, wherein, said sub-pixel unit is shaped as one of a rectangle, a circle, a triangle or another polygon.

9. The autostereoscopic pixel emitting unit of claim 1, wherein the sub-pixel units are arranged in one of a latitude and longitude line arrangement in which said sub-pixel units are aligned with each other, a diagonal arrangement, a two-line crossing arrangement, a mismatching arrangement, or in the shape of a polygon.

10. The autostereoscopic pixel emitting unit of claim 1, wherein several of said sub-pixel units are arranged on the circuit board, and form a display unit, and, several said sub-pixel unit modules are arranged vertically and horizontally to form a display surface in a plane or in a curved shape.

11. An autostereoscopic display device comprising:
a control system; and
the autostereoscopic pixel emitting unit of claim 1, the autostereoscopic pixel emitting unit is connected to the control system through said circuit board, where the control system controls the autostereoscopic pixel emitting unit.

12. The autostereoscopic display device of claim 11, wherein, the autostereoscopic display device comprises several of said autostereoscopic pixel emitting units arranged in several display columns, with any two adjacent display columns in said display columns aligned with each other.

13. The autostereoscopic display device of claim 11, wherein, a light-exiting surface of the optical guide area in said several autostereoscopic pixel emitting units has a longitudinal axis.

14. The autostereoscopic display device of claim 13, wherein, said longitudinal axis is vertical to the arrangement direction of light-emitting unit of the sub-pixel unit of the autostereoscopic pixel emitting units.

15. The autostereoscopic display device of claim 13, wherein, said longitudinal axis has an angle with respect to the arrangement direction of light-emitting unit of the sub-pixel unit of the autostereoscopic pixel emitting units.

16. The autostereoscopic display device of claim 11, wherein, said control system controls the sub-pixel unit of the autostereoscopic pixel emitting unit to display 2D images.

17. The autostereoscopic display device of claim 12, wherein, said control system controls the several autostereoscopic pixel emitting units to display both 3D and 2D images.

18. The autostereoscopic display device of claim 11, wherein, said autostereoscopic display device includes a 2D display device, and the control system controls said autostereoscopic display device and said 2D display device.

19. The autostereoscopic display device of claim 11, wherein, said autostereoscopic display device also includes a 2D display device, and the autostereoscopic display unit and the 2D display unit are arranged alternatively on the circuit board with adjacent lines and columns respectively, to form a display unit module.

20. The autostereoscopic display device of claim 11, wherein, the display area of said autostereoscopic display device comprises a 3D display area including said autostereoscopic pixel emitting unit, and a 2D display area including a 2D display device.

21. The autostereoscopic display device of claim 11, wherein, said autostereoscopic display device is connected with a content display device and a content storage device;
the content display device is connected with the autostereoscopic display device through a data signal circuit, receives and decodes image data with 3D information, and sends decoded multi-view image signals to the autostereoscopic display device;
the content storage device is connected with the content display device through a data communication circuit, and stores the image data with 3D information and sends the 3D information and image data to the content display device through the data communication circuit.

22. The autostereoscopic display device of claim 21, wherein free-form surfaces of the autostereoscopic display device and a 2D display device splice seamlessly to an arbitrary large area.

* * * * *